3,124,554
LINEAR POLYESTERS OF COMPOUNDS CONTAINING UP TO TWO ALKENYL GROUPS SUBSTITUTED ON A BENZENE NUCLEUS AND MIXTURES THEREOF WITH A VINYL COMPOUND
Hermann Schnell and Werner Schulte-Huermann, Krefeld-Uerdingen, Germany, assignors to Farbenfabriken Bayer Aktiengesellschaft, Leverkusen, Germany, a corporation of Germany
No Drawing. Filed Sept. 12, 1960, Ser. No. 55,131
12 Claims. (Cl. 260—45.5)

This application is a continuation-in-part of our co-pending application Serial No. 635,570, filed January 23, 1957, now abandoned.

It is known to produce unsaturated polyesters by esterifying unsaturated dicarboxylic acids, alone or in admixtures with aromatic or saturated aliphatic dicarboxylic acids, with aliphatic dihydroxy compounds. These unsaturated polyesters have acquired technical significance especially by the fact that they can be converted in solution in polymerizable vinyl compounds such as styrene, into insoluble copolymers having good properties.

The present invention relates to a new class of polymerizable polyesters having special properties. Particularly it relates to polymerizable high molecular weight linear polyesters which may as such be converted into insoluble polymers under the influence of oxygen or at elevated temperatures, or which form insoluble copolymers by polymerization with monomeric vinyl compounds.

Generally the new polymerizable high molecular weight linear polyesters according to the invention contain in their chains, radicals of aromatic dihydroxy compounds with up to two benzene nuclei and with up to two $\beta$-alkenyl radicals at one benzene nucleus as side chains, these $\beta$-alkenyl radicals corresponding to the general formula

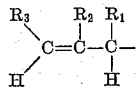

wherein $R_1$ represents a substituent selected from the class consisting of hydrogen, lower alkyl and phenyl, $R_2$ represents a substituent selected from the class consisting of hydrogen, halogen and lower alkyl, and $R_3$ represents a substituent selected from the class consisting of hydrogen and lower alkyl.

The radicals of said aromatic dihydroxy compounds should be present in the polyester in such an amount that the $>C=C<$ portions of said alkenyl radicals amount to at least about 1 percent by weight of the polyester.

The present invention pertains particularly to linear, unsaturated polyesters having a K-value of at least about 20, measured in 1 percent cresol solution at 25° C., of organic dihydroxy compounds and dicarboxylic acids including carbonic acid, at least one of said polyester-forming components being selected from the group consisting of aromatic dihydroxy compounds (dihydric phenols) with up to two benzene nuclei, bis-hydroxy ethoxy benzenes with up to two benzene nuclei, bis-hydroxy propoxy benzenes with up to two benzene nuclei, bis-carboxy methoxy benzenes with up to two benzene nuclei, bis-carboxy ethoxy benzenes with up to two benzene nuclei, and bis-carboxy propoxy benzenes with up to two benzene nuclei, at least one of the benzene nuclei of said compounds being substituted directly by up to two $\beta$-alkenyl radicals of the formula mentioned above, the radical of said compounds being present in the polyesters in such an amount that the $>C=C<$ portions of said alkenyl radicals amount to at least about 1 percent by weight of the polyesters, these linear polyesters being crosslinkable through the double bonds of the alkenyl radicals to produce insoluble resins.

The present invention also pertains to mixtures of linear, unsaturated polyesters of the foregoing type which have been reacted with monomeric vinyl cross-linking agents of the styrene type.

The $\beta$-alkenyl groups which form side chains on the aromatic nuclei of the aromatic dihydroxy compounds may be the allyl radical ($CH_2=CH-CH_2-$) and derivatives thereof, such as the 1-methylallyl
($CH_2=CH-CH(CH_3)-$)
referred to hereinafter as 1-methallyl, the 1-ethylallyl ($CH_2=CH-CH(C_2H_5)-$), referred to hereinafter as 1-ethallyl, the 1-propylallyl ($CH_2=CH-CH(C_3H_7)-$), referred to hereinafter as 1-propallyl, the 1-phenylallyl ($CH_2=CH-CH(C_6H_5)-$), referred to hereinafter as 1-phenallyl, the 2-chloroallyl ($CH_2=C(Cl)-CH_2-$), the 2-bromoallyl ($CH_2=C(Br)-CH_2-$), the 2-methylallyl ($CH_2=C(CH_3)-CH_2-$), referred to hereinafter as 2-methallyl, the 2-ethylallyl ($CH_2=C(C_2H_5)-CH_2-$), referred to hereinafter as 2-ethallyl, the 2-propylallyl ($CH_2=C(C_3H_7)-CH_2-$), referred to hereinafter as 2-propallyl, the 2-butylallyl ($CH_2=C(C_4H_9)-CH_2-$), referred to hereinafter as 2-butallyl, and the crotyl (2-butenyl, $CH_3-CH=CH-CH_2-$) radicals.

One or two of these $\beta$-alkenyl radicals may be attached to one benzene nucleus of the radicals of the aromatic dihydroxy compounds.

Radicals of such $\beta$-alkenyl-substituted aromatic dihydroxy compounds which are combined in the polyesters within the scope of the present invention are, for instance, the radicals of mono- and disubstituted hydroquinone, pyrocatechol, resorcinol, of the dihydroxy naphthalenes and of the dihydroxy diphenyls, such as the radicals of mono- and diallyl- or methallyl-hydroquinone or of 2-chloroallyl- or 2-ethallyl- or 2-propallyl- or 1-ethallyl- or 1-phenallyl- or crotyl-hydroquinone, pyrocatechol or resorcinol, of 3-mono- or 3,3'-diallyl-1,4-dihydroxy naphthalene or 1,6-dihydroxy naphthalene or 2,6-dihydroxy naphthalene or 1,2-dihydroxy naphthalene or 2,2'-dihydroxyphenyl or of the corresponding derivatives thereof as described in the examples or the radicals of the various hydroquinones, pyrocatechols and resorcinols.

A particularly suitable class of $\beta$-alkenylated radicals of aromatic dihydroxy compounds as chain components of the new polyesters comprises alkenylated dihydroxydiaryl alkanes, especially 4,4'-dihydroxydiphenyl alkanes, such as mono-, di-, tri- and tetra-$\beta$-alkenyl-substituted 4,4'-dihydroxydiphenyl-methane, 1,1-(4,4'-dihydroxydiphenyl)-ethane,
1,1-(4,4'-dihydroxydiphenyl)-propane (bisphenol A),
1,1-(4,4'-dihydroxydiphenyl)-butane,
1,1-(4,4'-dihydroxydiphenyl)-2-methyl-propane,
1,1-(4,4'-dihydroxydiphenyl)-heptane,
1,1-(4,4'-dihydroxydiphenyl)-1-phenyl-methane,
(4,4'-dihydroxydiphenyl)-(4-methyl-phenyl)-methane, (4,4'-dihydroxydiphenyl)-(4-ethyl-phenyl)-methane,
(4,4'-dihydroxydiphenyl)-(4-isopropyl-phenyl)-methane,
(4,4'-dihydroxydiphenyl)-(4-butyl-phenyl)-methane,
(4,4'-dihydroxydiphenyl)-benzyl-methane,
(4,4'-dihydroxydiphenyl)-α-furyl-methane,
2,2-(4,4'-dihydroxydiphenyl)-propane,
2,2-(4,4'-dihydroxydiphenyl)-butane,
2,2-(4,4'-dihydroxydiphenyl)-pentane (melting point 149–150° C.),
2,2-(4,4'-dihydroxydiphenyl)-4-methyl-pentane,
2,2-(4,4'-dihydroxydiphenyl)-heptane (boiling point 198–200° C. under 0.3 mm. mercury gauge),
2,2-(4,4'-dihydroxydiphenyl)-octane,
2,2-(4,4'-dihydroxydiphenyl)-nonane (melting point 68° C.),
1,1-(4-4'-dihydroxydiphenyl)-1-phenyl-ethane,
(4,4'-dihydroxydiphenyl)-1-(α-furyl)-ethane,
3,3-(4,4'-dihydroxydiphenyl)-pentane,
4,4-(4,4'-dihydroxydiphenyl)-heptane,
1,1-(4,4'-dihydroxydiphenyl)-cyclopentane,
1,1-(4,4'-dihydroxydiphenyl)-cyclohexane,
2,2-(4,4'-dihydroxydiphenyl)-decahydronaphthalene (melting point 181° C.),
2,2-(4,4'-dihydroxy-3,3'-dicyclohexyl-diphenyl)-propane (melting point 144–146° C.),
2,2-(4,4'-dihydroxy-3-methyl-diphenyl)-propane (melting point 114° C.),
2,2-(4,4'-dihydroxy-3-isopropyl-diphenyl)-butane,
1,1-(4,4'-dihydroxy-3,3-dimethyl-diphenyl)-cyclohexane,
2,2-(4,4'-dihydroxy-3,3'-dibutyl-diphenyl)-propane,
2,2-(4,4'-dihydroxy-3,3'-diphenyl-diphenyl)-propane,
and 2,2-(4,4'-dihydroxy-2,2'-dimethyl-diphenyl)-propane.

The β-alkenyl-substituted dihydroxy-diaryl alkanes which may be used as starting materials for producing the new polyesters of the present invention may be obtained, for example, by condensing the corresponding mono-β-alkenyl-substituted aromatic mono-hydroxy compounds or mixtures thereof with unsubstituted aromatic mono-hydroxy compounds with aldehydes or ketones in known manner or by the Claisen re-arrangement of the mono- or di-β-alkenyl ethers of the corresponding aromatic dihydroxy compounds, or of mono- or di-β-alkenyl-substituted compounds, or by nuclear alkenylization of the corresponding aromatic dihydroxy compounds with an alkenyl halogenide.

As typical representatives of such alkenyl-substituted dihydric phenol compounds there may be mentioned 2,2-(3,3'-diallyl-4,4'-dihydroxydiphenyl)-propane,
2,2-(3,3'-di-(2-methallyl)-4,4'-dihydroxydiphenyl)-propane,
2,2-(3,3'-di-(2-bromoallyl)-4,4'-dihydroxydiphenyl)-propane,
2,2-(3,3'-di-(3-propallyl)-4,4'-dihydroxydiphenyl)-propane,
2,2-(3,3'-di-(1-phenallyl)-4,4'-dihydroxydiphenyl)-propane,
2,2-(3,3'-di-(1-methallyl)-4,4'-dihydroxydiphenyl)-propane,
2,2-(3,3'-di-(1-ethallyl)-4,4'-dihydroxydiphenyl)-propane,
1,1-(3,3'-diallyl-4,4'-dihydroxydiphenyl)-cyclohexane,
1,1-(3,3'-di-(2-methallyl)-4,4'-dihydroxydiphenyl)-cyclohexane,
1,1-(3,3'-di-(2-bromoallyl)-4,4'-dihydoxydiphenyl)-cyclohexane,
1,1-(3,3'-di-(3-propallyl)-4,4'-dihydroxydiphenyl)-cyclohexane,
1,1-(3,3'-di-(1-phenallyl)-4,4'-dihydroxydiphenyl)-cyclohexane,
1,1-(3,3'-di-(1-methallyl)-4,4'-dihydroxydiphenyl)-cyclohexane,
and 1,1-(3,3'-di-(1-ethallyl)-4,4'-dihydroxydiphenyl)-cyclohexane.

In the new polyesters, the radicals of the aromatic dihydroxy compounds with β-alkenyl radicals as described in the foregoing paragraphs preferably may be attached to carbonic acid radicals to produce polyesters, or these polyesters can be formed with radicals of other dicarboxylic acids.

Furthermore, the β-alkenyl-substituted aromatic dihydroxy compounds as chain elements of the new polyesters also may be components of dihydroxy compounds with aliphatically bound hydroxyl groups or components of dicarboxylic acids.

Thus the reaction products of one mol of the various aromatic dihydroxy compounds having β-alkenyl radicals of the class mentioned above, with about 2 mols of ethylene oxide or propylene oxide or glycol carbonate or glycol chlorohydrin (ethylene chlorohydrin, 2-chloroethanol), that is to say the di-β-hydroxy ethyl or hydroxypropyl ethers of these aromatic dihydroxy compounds, may be used as starting material for the manufacture of the new polyesters. In these cases, the radicals of the β-alkenyl-substituted aromatic dihydroxy compounds of the class mentioned above are present in the chains as components of radicals of diether-diols of those aromatic dihydroxy compounds, the etherdiol radicals being further attached to radicals of bifunctional organic acids including carbonic acid.

Finally, it is also within the scope of the invention that the aromatic dihydroxy compounds with β-alkenyl radicals of the class mentioned above are present as chain elements in the new polyesters as components of diether dicarboxylic acids of such aromatic dihydroxy compounds, these diether-dicarboxylic acid radicals being further attached to radicals of dihydroxy compounds. The corresponding diether-dicarboxylic acids which may be used as starting materials for the production of the new polyesters may be obtained by reacting 1 mol of an aromatic dihydroxy compound having β-alkenyl radicals with about 2 mols of a mono-halogenated mono-carboxylic acid such as mono-chloro- or bromo-acetic-, propionic-, butyric- or isobutyric acid. Diether dicarboxylic acids of the said kind in which the ether acid radicals are terminal groups and which are saturated and have up to 3 carbon atoms in the aliphatic hydrocarbon radical between each oxygen atom and the carboxylic group, are preferred. Typical representatives of such radicals are for instance the radicals of diallyl- or dimethallyl- or dicrotoyl-hydroquinone or -dihydroxy-diphenyl- or -dihydroxy-diphenyl alkanes, -dioxa-diacetic- or -dipropionic- or -dibutyric- or -diisobutyric acid.

Suitable bifunctional organic acid chain components of the polyesters there the radicals of saturated aliphatic dicarboxylic acids such as oxalic, succinic, glutaric, adipic, pimelic, suberic, azelaic and sebacic acid, furthermore the radicals of unsaturated aliphatic dicarboxylic acid such as fumaric, maleic, citraconic, and itaconic acid, the radicals of cycloaliphatic dicarboxylic acids, such as the hexahydrophthalic acids, and finally the radicals of aromatic dicarboxylic acids, such as the three phthalic acids, i.e., phthalic, isophthalic and terephthalic acid, and naphthalic acid and diphenyldicarboxylic acid.

In those cases mentioned above in which the aromatic dihydroxy compounds with β-alkenyl radicals are present in the polyesters as components of radicals of diether-dicarboxylic acids, such dicarboxylic acids may be attached to any radicals of the dihydroxy compounds that are normal components of polyesters. Radicals of such dihydroxy compounds known in the art furthermore may be present in the new polyesters and thus attached to radicals of any organic bifunctional acids described above in the chains besides the radicals of the aromatic dihydroxy compounds with β-alkenyl radicals. Thus the new polyesters may still contain radicals of the usual aliphatic, cycloaliphatic, aromatic, and araliphatic dihydroxy compounds.

Radicals of such usual aliphatic dihydroxy compounds include the radicals of saturated aliphatic diols with up to 6 carbon atoms in the chain such as 1,2-ethane-, 1,3-propane-, 2-ethyl-1,3-propane-, 2,2-dimethyl-1,3-propane-, 1,4-butane-, 1,3-isobutane-, 1,5-pentane-, 1,4-pentane-, 1,4-isopentane-, 1,6-hexane-, 1,5-hexane-, and 1,4-hexanediol.

Furthermore there may be present in the new polyesters the radicals of for instance dihydroxy cyclohexane and the radicals of perhydro-dihydroxy-diaryl alkanes, such as of perhydro-dihydroxy-diphenyl alkanes especially of perhydro-4,4'-dihydroxy-diphenyl alkanes and of all perhydro-dihydroxy-diaryl alkanes which are obtainable by complete hydrogenation of the dihydroxy-diaryl alkanes described above. The most important representatives of this class are the radicals of perhydro-2,2-(4,4'-dihydroxy-diphenyl)-propane and of perhydro-1,1-(4,4'-dihydroxy-diphenyl)-cyclohexane.

Other radicals of dihydroxy compounds which may be present as chain elements in the new polyesters are the radicals of polyethylene glycols, such as of diethylene glycol and triethylene glycol.

Representative radicals of aromatic dihydroxy compounds included within this reference are the radicals of dihydroxy benzenes with up to two benzene nuclei such as the radicals of hydroquinone, resorcinol, pyrocatechol, of the dihydroxy-diphenyls, and especially of the dihydroxy-diaryl alkanes, particularly of the dihydroxy-diphenyl alkanes as they are mentioned above. Of this class of radicals there may be especially named again the radicals of 2,2-(4,4'-dihydroxydiphenyl)-propane and of 1,1-(4,4'-dihydroxydiphenyl)-cyclohexane.

Finally, in the new polyesters there may be present as chain elements, radicals of araliphatic dihydroxy compounds, for instance the radicals of dihydroxydiethyl and dihydroxydipropyl diethers of aromatic dihydroxy compounds, especially of dihydroxy benzenes with up to two benzene nuclei. There may be mentioned, for example, the radicals of the dihydroxydiethyl and the dihydroxydipropyl diethers of hydroquinone, of resorcinol, of pyrocatechol, of the dihydroxy-diphenyls and of the dihydroxy-diaryl alkanes as they are described above. Among the latter, there may be particularly named the radicals of the dihydroxydiethyl and the dihydroxydipropyl diethers of 2,2-(4,4'-dihydroxydiphenyl)-propane and of the 1,1-(4,4'-dihydroxydiphenyl)cyclohexane.

The new polyesters may be obtained by methods well known in the art for producing polyesters, that is to say dihydroxy compounds of the classes described above are esterified or re-esterified with bifunctional organic acids of the classes described above or their diesters with lower aliphatic or aromatic monohydroxy compounds by heating under suitable conditions optionally in the presence of conventional esterifying or re-esterifying catalysts.

When polycarbonates are the desired products, they may be produced according to the invention by reesterifying the dihydroxy compounds or mixtures of several substances of these classes with diesters of carbonic acid, for instance, with dialkyl as well as with diaryl esters, preferably with diphenyl carbonate. Eventually dialkyl or diaryl dicarbonates of aromatic dihydroxy compounds, particularly of dihydroxy diaryl alkanes, also may be used. Furthermore, the dihydroxy compounds may be reacted in known manner with other derivatives of carbonic acid such as phosgene or bis-chlorocarbonic esters of dihydroxy compounds including the bis-chlorocarbonic esters of aromatic dihydroxy compounds with β-alkenyl radicals of the classes mentioned above. The reactions with phosgene or with bis-chlorocarbonic esters of dihydroxy compounds preferably may be carried out in the presence of solvents and/or of water and in the presence of hydrogen chloride binding agents and optionally in the presence of catalysts such as tertiary amines.

The new polymerizable polyesters are solid masses or viscous liquids which dry in a thin layer when exposed to oxygen or air to form hard resilient films. This drying process can be accelerated by addition of conventional driers such as cobalt naphthenate. When heated in a thin layer or in bulk to temperatures up to 300° C., hard, resilient and insoluble compounds are formed in a short time.

When the polyesters are dissolved in vinyl compounds such as styrene, divinylbenzene, vinyltoluene, α-methylstyrene, vinylchloride, vinylacetate, vinylbenzoate, vinylmethylketone, acrylnitrile, methylmethacrylate, ethylmethacrylate, butylmethacrylate, cyclohexylmethacrylate, 2-ethylhexylmethacrylate, methylacrylate, ethylacrylate, butylacrylate, glycol-bis-methacrylate, glycidylmethacrylate, trimethylolpropane diacrylate and trimethylolpropane dimethacrylate, diallylphthalate, trialylcyanurate, chloro-methyl-phosphoric acid-diallyl ester, glycol-bis-allyl carbonate, butanediol-bis-allyl carbonate or diethylene-glycol-bis-allyl carbonate, there are obtained under the influence of redox catalysts at room temperature, or of catalytic peroxides at elevated temperatures, insoluble, hard, resilient, clear, transparent compounds having excellent mechanical and electrical properties. Some of the properties of the products may be improved by the inclusion of fibres, particularly glass fibres. The products obtained according to the invention may be used, for example, as air-drying or stove-drying lacquers, as moulding or cast resins.

Air-drying and stove-drying lacquers exhibit in addition to great hardness and adhesiveness, have a beautiful lustre and good pigmentability; they are distinguished in particular by a good resistance to ageing even in the presence of light, air and moisture, and by their great resilience.

Cast resins which are obtained by dissolving the polyesters in monomeric polymerizable vinyl compounds, form after polymerization insoluble copolymers of good mechanical properties which can be improved by including glass fibres during their formation. They are distinguished especially by their excellent resistance to cold and hot water and a high stability to saponifying agents, particularly acids.

The following examples are given for the purpose of illustrating the invention.

*Example 1*

In a flask fitted with a descending air-condenser a mixture of 77 parts by weight of 2,2-(3,3'-di-allyl-4,4'-dihydroxydiphenyl)-propane, 56 parts by weight of diphenyl carbonate and 0.015 part by weight of the sodium salt of 2,2-(4,4'-dihydroxydiphenyl)-propane is heated with stirring in a nitrogen atmosphere. At 110–150° C./20 mm. mercury gauge the split off phenol is distilled off. The vacuum is increased to 0.3 mm. mercury gauge pressure and the temperature to 200° C. The catalyst is then neutralized by the addition of 0.020 part by weight of phenyl-chloroformic acid ester and the temperature raised to 220° C. at 0.3 mm. mercury gauge until no further diphenyl carbonate distills over. The whole time of condensation is about 3 hours. The residual viscous melt (85 parts by weight) forms upon cooling a water-clear brittle resin which may be pulverized without difficulty. Its K-value is 40 (measured in cresol at 25° C.).

24 parts by weight of this pulverized polycarbonate are dissolved in 18 parts by weight of styrene. The clear highly viscous solution is treated with 2 parts by weight of a benzoylperoxide past (50 percent in dibutylphthalate) and allowed to stand at 70° C. for 1 hour. A colorless transparent insoluble plastic material is thus obtained having excellent mechanical and electrical properties and compared with the known polyesters, an increased resistance to chemicals and water. The mechanical strength of this copolymer is substantially improved by addition of 40 percent of glass fibres.

*Example 2*

In a flask fitted with descending air condenser a mixture of 61.6 parts by weight of 2,2-(3,3'-dially-4,4'-dihydroxydiphenyl)-propane, 23.6 parts by weight of hexanediol, 87.2 parts by weight of diphenyl carbonate and 0.005 part by weight of the sodium salt of 2,2-(4,4'-dihydroxydiphenyl)-propane is heated with stirring in a nitrogen atomsphere. At 150–160° C. and a pressure of 30 mm. mercury gauge the bulk of the split off phenol distils off. At a pressure of 0.3 mm. mercury gauge the temperature is raised to 240° C. When the melt becomes highly viscous and no further diphenyl carbonate or hexanediol distils off, the condensation is complete. The cold allyl-polycarbonate (88 parts by weight), K-value 50 (determined in cresol at 25° C.), is a rubber-elastic to viscous, slightly yellowish resin which is soluble in aromatic hydrocarbons, esters and chlorinated solvents.

When a 25 percent solution of this resin in methylene chloride is mixed with 1 percent of cobalt naphthenate and 1 percent of benzoyl peroxide and applied to a glass plate in a thin layer, a clear film can be lifted off after evaporation of the solvent, which is insoluble after standing at room temperature for some hours and possesses good mechanical properties. The hardening through of the film is accelerated by standing at 70° C. for a half hour.

*Example 3*

In a flask fitted with descending air condenser a mixture of 154 parts by weight of 2,2-(3,3'-diallyl-4,4'-dihydroxydiphenyl)-propane, 55.5 parts by weight of diethylene glycol, 235 parts by weight of diphenyl carbonate and 0.025 part by weight of the sodium salt of 2,2-(4,4'-dihydroxydiphenyl)-propane is heated with stirring in a nitrogen atmosphere. The phenol distils off at 140–160° C. under a pressure of 25 mm. mercury gauge. The vacuum is raised to a pressure of 0.6 mm. mercury gauge and the temperature to 190° C. The catalyst is then neutralized by the addition of 0.030 part by weight of phenylchloroformic acid ester and the temperature further raised to 220° C./0.3 mm. mercury gauge until the melt becomes highly viscous. The polycarbonate (K-value 26, measured in cresol at 25° C.) is upon cooling a viscous to rubber-elastic, slightly yellowish, transparent resin.

When a solution of this resin in toluene is applied onto metal and heated to 270° C. for 10 minutes, a well adherent, insoluble, clear coating is obtained which is elastic and has an excellent surface hardness. Upon addition of a drier to the solution of this resin, the hardening through occurs also at a lower temperature. The lacqer coating has excellent elastic properties.

*Example 4*

In a flask mixture of 30.8 parts by weight of 2,2-(3,3'-diallyl-4,4'-dihydroxydiphenyl)-propane, 47.7 parts by weight of 2,2 - (4,4' - dihydroxydiphenyl) - propane-bis-phenyl carbonate and 0.004 part by weight of the sodium salt of 2,2-(4,4'-dihydroxydiphenyl)-propane is heated with stirring in a nitrogen atmosphere. The phenol distils off at 120–180° C. under a vacuum of 15 mm. mercury gauge pressure. The temperature is further increased to 240° C. at 0.3 mm. mercury gauge until no further diphenyl carbonate distils off. After about 4 hours, when the melt is highly viscous, the condensation is completed. The allyl-polycarbonate (K-value 45, measured in cresol at 25° C.) is a water-clear colorless resin which is brittle in the cold and soluble in aromatic hydrocarbons, esters and chlorinated solvents.

10 parts by weight of the pulverized resin are dissolved in a mixture of 5 parts by weight of styrene and 5 parts by weight of methacrylic acid methyl ester and treated with 0.8 part by weight of benzoyl-peroxide paste. The solution is stored overnight at 70° C. A water-clear colorless copolymer of good mechanical properties is obtained.

*Example 5*

A mixture of 63.6 parts by weight of 2,2-(3,3'-diallyl-4,4'-dihydroxydiphenyl)-propane-diacetic acid, 7.3 parts by weight of adipic acid and 21.2 parts by weight of diethylene glycol is heated with stirring in a nitrogen atmosphere. The nearly theoretical quantity of water is split off at a temperature of 180° C., the melt is highly viscous. The polyester (K-value 27.2, measured in cresol at 25° C.) is upon cooling a viscous, slightly tacky, clear and slightly yellowish resin.

If 6 parts by weight of the polyester dissolved in 4 parts by weight of methacrylic acid methyl ester, are treated with 0.4 part by weight of benzoyl-peroxide paste and stored overnight at 70° C., a clear, slightly yellowish insoluble plastic material of good mechanical properties is obtained.

*Example 6*

A mixture of 49.5 parts by weight of 2,2-(3,3'-diallyl-4,4'-dihydroxy-ethoxyphenyl)-propane and 53.1 parts by weight of 2,2-(3,3'-diallyl-4,4'-dihydroxydiphenyl)-propane-diacetic acid is heated with stirring to 160° C. in a nitrogen atmosphere. The condensation is continued at this temperature for 5 hours and at 180° C. for a further 4 hours until the theoretical amount of water is distilled off. The cold polyester thus obtained is a brittle, clear, slightly yellowish resin having a K-value of 32.2 (measured in cresol at 25° C.).

6 parts by weight of the resin are dissolved in 6 parts by weight of toluene and treated with 0.3 part by weight of a cobalt, lead or manganese naphthenate, and 0.3 part by weight of benzoyl peroxide. The solution is applied in a thin coat to a glass plate. The lacquer is air-dry after 1 hour and insoluble after 24–36 hours. The hardening through is accelerated at elevated temperature. A sample stored at 100° C. for 3 hours yields a highly glazed coating having a good anchorage of sufficient elasticity and yet a good surface hardness.

*Example 7*

A mixture of 79.2 parts by weight of 2,2-(3,3'-diallyl-4,4'-dihydroxy-diethoxydiphenyl)-propane and 29.2 parts by weight of adipic acid is heated with stirring in a nitrogen atmosphere, first to 160° C. for 4 hours and then to 180° C. for 12 hours. The cold polyester (K-value 34.0, measured in cresol at 25° C.) is a kneadable, slightly yellowish, clear resin.

By spreading a 50 percent solution of the polyester in toluene, and heating it to 180° C. for ½ hour, an insoluble, elastic coating of firm anchorage and good surface hardness is obtained.

*Example 8*

A mixture of 79.2 parts by weight of 2,2-(3,3'-diallyl-4,4'-dihydroxy-diethoxydiphenyl)-propane and 29.6 parts by weight of phthalic anhydride is heated with stirring in a nitrogen atmosphere, first to 160° C. for 5 hours and then to 180° C. for 12 hours, until the theoretical amount of water is split off. The cold polyester (K-value 25, measured in cresol at 25° C.) is a brittle, slightly yellowish, clear resin.

6 parts by weight of the polyester are dissolved in 4 parts by weight of glycol-bis-methacrylate and treated with 0.5 part by weight of benzoyl-peroxide paste. After storing the solution for ½ hour at 95° C., an insoluble, slightly yellowish, clear copolymer is obtained.

*Example 9*

In a flask a mixture of 19 parts by weight of diallyl-hydroquinone, 26.8 parts by weight of 1,1-(4,4'-dihydroxydiphenyl)-cyclohexane, 45 parts by weight of diphenyl carbonate and 0.01 part by weight of the sodium salt of 2,2-(4,4'-dihydroxydiphenyl)-propane is heated with stirring in a nitrogen atmosphere. The condensation reaction first is carried out for 3 hours at 125–150°

C./12 mm., until the bulk of the phenol is distilled off. Then condensation is continued for 4 hours at 150–210° C. and 0.3 mm. mercury gauge, until no further phenol and diphenyl carbonate distils over. A slightly yellowish, clear resin, brittle in the cold (K-value 23.0, measured in cresol at 25° C.), is obtained, which dissolved in a vinyl monomer, may be hardened by heating after the addition of peroxide catalysts.

*Example 10*

Into a mixture of 103.2 parts by weight of 2,2-(4,4'-dihydroxydiphenyl)-propane, 46.5 parts by weight of 2,2 - (3,3' - diallyl-4,4'-dihydroxydiphenyl)-propane, 330 parts by weight of methylenechloride, 615 parts of water and 165 parts by weight of a 45 percent sodium hydroxide solution is introduced with stirring at 25° C. within 2 hours 71.6 parts by weight of phosgene. Then 0.24 part by weight of triethylamine and 2 parts by weight of the sodium salt of isopropylnaphthalene sulfonic acid are added. The organic solution of the polycarbonate thus obtained becomes highly viscous within 55 minutes at slowly increased temperature. The solution is washed free from electrolytes in a kneader and solvent and water are evaporated in vacuo. A colorless, transparent, highly elastic, plastic material remains which is soluble e.g. in chlorohydrocarbons and aromatic hydrocarbons. K-value 77.6.

If 130 parts by weight of styrene are added to the highly viscous solution free from electrolytes described above, and if methylene chloride and water then are distilled off in vacuo, a highly viscous solution of the polycarbonate in styrene is obtained, which after the addition of 10 parts by weight of benzoyl peroxide paste can be hardened in 5 minutes at 120° C. to colorless, transparent mouldings having good mechanical properties, good resistance to chemicals and excellent electrical properties.

*Example 11*

Into a mixture of 92.9 parts by weight of 2,2-(3,3'-diallyl-4,4'-dihydroxydiphenyl)-propane, 68.8 parts by weight of 2,2-(4,4'-dihydroxydiphenyl)-propane, 73 parts by weight of styrene, 257 parts by weight of methylene chloride, 615 parts of water and 156 parts by weight of a 45 percent sodium hydroxide solution, 71.6 parts by weight of phosgene are introduced with stirring at 25° C. within 2 hours. Then 0.24 part by weight of triethylamine and 2 parts by weight of the sodium salt of isopropyl naphthalene sulfonic acid are added. The organic solution of the polycarbonate thus obtained becomes highly viscous within 20 minutes at slowly increased temperature. The methylene chloride and water are evaporated, and a highly viscous solution of the polycarbonate in styrene (K-value 54.0) is obtained, which after the addition of benzoyl peroxide paste may be hardened to mouldings as described in Example 10.

*Example 12*

A mixture of 50.4 parts by weight of 2,2-(3,3'-dimethallyl - 4,4' - dihydroxydiphenyl)-propane, 33.8 parts by weight of diphenyl carbonate and 0.01 part by weight of the sodium salt of 2,2-(4,4'-dihydroxydiphenyl)-propane is condensed as described in Example 1. A clear, viscous resin (K-value 29, measured in cresol at 25° C.) is obtained, which, in a 70 percent solution of styrene, by heating yields a clear, viscous copolymer, after polymerization with a 4 percent benzoyl peroxide paste (50 percent in dimethylphthalate).

*Example 13*

A mixture of 29.4 parts by weight of 3,3'-dimethallyl-4,4'-dihydroxydiphenyl, 5.6 parts by weight of 1,6- hexanediol, 13.4 parts by weight of 1,1-(4,4'-dihydroxydiphenyl)-cyclohexane, 45.0 parts by weight of diphenyl carbonate and 0.01 part by weight of the sodium salt of 2,2-(4,4'-dihydroxydiphenyl)-propane is condensed as described in Example 1. An almost water-clear, solid resin (K-value 31.6, measured in cresol at 25° C.) is obtained. A sample stored at 80° C. for 1 hour yields, in a 60 percent solution of styrene, a clear, insoluble copolymer after polymerization with a 4 percent paste of benzoyl peroxide.

*Example 14*

A mixture of 29.4 parts by weight of 3,3'-dimethallyl-4,4'-dihydroxydiphenyl, 13.4 parts by weight of 1,1-(4,4'-dihydroxydiphenyl)-cyclohexane, 33.8 parts by weight of diphenyl carbonate and 0.01 part by weight of the sodium salt of 2,2 - (4,4' - dihydroxydiphenyl) - propane is condensed as described in Example 2. A slightly clear, solid resin having a K-value of 45, measured in cresol at 25° C., is obtained.

If 6 parts by weight of the resin dissolved in 4 parts by weight of styrene are mixed with 0.4 part by weight of benzoyl peroxide paste, and the solution is stored during 1 hour at 80° C., a water-clear, viscous, insoluble copolymer having an excellent resistance to water and good electrical properties is obtained. During the polymerization the products does not shrink.

*Example 15*

A mixture of 26.6 parts by weight of 3,3'-diallyl-4,4'-dihydroxydiphenyl, 13.4 parts by weight of 1,1-(4,4'-dihydroxydiphenyl)-cyclohexane, 33.8 parts by weight of diphenyl carbonate and 0.005 part by weight of the sodium salt of 2,2-(4,4'-dihydroxydiphenyl)-propane is condensed as described in Example 3. A clear, slightly yellowish resin solid in the cold (K-value 36.4, measured in cresol at 25° C.) is obtained. After copolymerization with styrene the resin has the properties of the copolymers of Example 14. Addition of methylmethacrylate increases impact strength and flex life of the copolymer.

*Example 16*

A mixture of 33.6 parts by weight of 2,2-(3,3'-dimethallyl - 4,4' - dihydroxydiphenyl) - propane, 5.3 parts by weight of diethylene glycol, 11.4 parts by weight of 2,2-(4,4'-dihydroxydiphenyl)-propane and 0.01 part by weight of the sodium salt of 2,2-(4,4'-dihydroxydiphenyl)-propane is condensed as described in Example 1. A clear resin solid in the cold (K-value 38.0) is obtained, which, when dissolved to form a 60 percent solution in glycol dimethacrylate, hardens to a clear, highly elastic, insoluble copolymer after the addition of 4 percent by weight of the 50 percent by weight benzoyl peroxide paste and heating for 1 hour at 80° C.

*Example 17*

A mixture of 34.8 parts by weight of 1,1-(3,3'-diallyl-4,4' - dihydroxydiphenyl) - cyclohexane, 22.8 parts by weight of 2,2-(4,4'-dihydroxydiphenyl)-propane, 45.0 parts by weight of diphenyl carbonate and 0.01 part by weight of the sodium salt of 2,2-(4,4'-dihydroxydiphenyl)-propane is condensed as described in Example 3. A clear resin solid in the cold (K-value 43) is obtained.

If 6 parts by weight of the resin dissolved in 4 parts by weight of styrene are mixed with 0.4 part by weight of benzoyl peroxide paste and stored for 1 hour at 80° C. a water-clear, insoluble copolymer with good resistance to water and good electrical properties is obtained which does not shrink.

*Example 18*

A mixture of 38.7 parts by weight of 2,2-(3,3'-diallyl-4,4'-di-β-hydroxy-diethoxy-diphenyl)-propane, 103.6 parts by weight of phthalic acid anhydride, 29.4 parts by weight of maleic acid anhydride and 81 parts by weight of 1,3-butanediol is esterified at 180° C. under nitrogen free from oxygen, until no further water distils over. The polyester is treated with 0.015 part by weight of hydroquinone after cooling at 110° C. and dissolved in 250 parts by weight of styrene by heating under vacuo.

100 parts by weight of this polyester solution are mixed with 4 parts by weight of cyclohexanone peroxide paste and 1 part by weight of cobaltnaphthenate (20 percent in toluene). If this solution is cast over a wooden plate it gels after 15 minutes and hardens after 10 hours to a solid coating with dry surface. At a temperature of 50–60° C. complete hardening occurs after 30 minutes.

*Example 19*

A mixture of 84.8 parts by weight of 2,2-(3,3'-diallyl-4,4'-di-β-hydroxy-dipropoxy-diphenyl)-propane, 14.8 parts by weight of phthalic acid anhydride and 14.6 parts by weight of adipic acid is esterified as described in Example 7. The polyester thus obtained is a resin, thermoplastic in the cold, soluble in aromatic compounds and suitable as a stove drying lacquer material.

We claim:

1. A linear unsaturated polyester having a K-value of at least about 20, based upon a 1-percent solution of the polyester in cresol at 25° C., consisting of a product of the reaction of
   (a) a dihydroxy compound of the group consisting of saturated aliphatic and cycloaliphatic diols and dihydric phenols, with
   (b) an acid of the group consisting of carbonic acid and dicarboxylic acids,
one of the said two reactants being a compound selected from the group consisting of dihydric phenols having up to two benzene nuclei, dihydroxy ethoxybenzenes having up to two benzene nuclei, dihydroxy propoxybenzenes having up to two benzene nuclei, dicarboxy methoxybenzenes having up to two benzene nuclei, dicarboxy ethoxybenzenes having up to two benzene nuclei, and dicarboxy propoxybenzenes having up to two benzene nuclei, at least one of the benzene nuclei of the said compound being substituted directly on the ring with up to two β-alkenyl radicals having the general formula

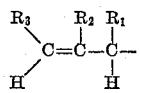

wherein $R_1$ is a substituent of the group consisting of hydrogen, lower alkyl and phenyl, $R_2$ is a substituent of the group consisting of hydrogen, halogen and lower alkyl, and $R_3$ is a substituent of the group consisting of hydrogen and lower alkyl, the radicals of the said compound being present in the polyester in such a proportion that the >C=C< portion of the alkenyl radicals amounts to at least about 1 percent by weight of the polyester, the linear polyesters being cross-linkable through the double bonds of the alkenyl radicals to produce insoluble resins.

2. A crosslinkable mixture of a linear unsaturated polyester as defined in claim 1 together with a sufficient amount of a monomeric vinyl cross-linking agent of the group consisting of styrene, vinyl chloride, vinyl acetate, vinyl benzoate, vinyl methyl ketone, acrylonitrile, methyl methacrylate, ethyl methacrylate, butyl methacrylate, cyclohexyl methacrylate, 2-ethylhexyl methacrylate, methyl acrylate, ethyl acrylate, butyl acrylate, glycol bismethacrylate, glycidyl methacrylate, trimethylolpropane diacrylate, trimethylolpropane dimethacrylate, diallyl phthalate, triallyl cyanurate, chloromethyl-phosphoric acid-diallyl ester, glycol-bis-allyl carbonate, butanediol-bis-allyl carbonate and diethylene-glycol-bis-allyl carbonate, to cause the polyester to become cross-linked.

3. A linear polycarbonate of a dibasic phenol having no more than two phenyl rings in at least one of which there is substituted directly on the ring a beta-alkenyl radical having the formula

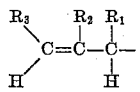

wherein $R_1$ is a substituent of the group consisting of hydrogen, lower alkyl and phenyl, $R_2$ is a substituent of the group consisting of hydrogen, halogen and lower alkyl, and $R_3$ is a substituent of the group consisting of hydrogen and lower alkyl, said polycarbonate having a K-value of at least 23 and being cross linkable through the double bonds of the alkenyl radicals to produce an insoluble resin.

4. A linear polycarbonate of a mixture of (a) a dihydroxy compound free of ethylenic unsaturation of the group consisting of aromatic and saturated aliphatic dihydroxy compounds, and (b) a dibasic phenol having no more than two phenyl rings in at least one of which there is substituted directly on the ring a beta alkenyl radical having the formula

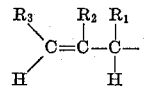

wherein $R_1$ is a substituent of the group consisting of hydrogen, lower alkyl and phenyl, $R_2$ is a substituent of the group consisting of hydrogen, halogen and lower alkyl, and $R_3$ is a substituent of the group consisting of hydrogen and lower alkyl, said phenol being present in the proportion of at least 46.5 parts by weight for every 103.2 parts by weight of said dihydroxy compound, said polycarbonate having a K-value of at least 23 and being cross linkable through the double bonds of the alkenyl radicals to produce an insoluble resin.

5. A polycarbonate as defined in claim 3 in which the alkenyl-substituted dibasic phenol is a bis-(monohydroxyphenyl)-alkane.

6. A polycarbonate as defined in claim 4 in which the dibasic phenol is a bis-(parahydroxyphenyl)-alkane and each phenyl ring in this phenol is substituted by a beta-alkenyl radical.

7. A polycarbonate as defined in claim 4 in which the dihydroxy compound free of ethylenic unsaturation is a bis-(hydroxyphenyl)-alkane.

8. A crosslinkable mixture of a polycarbonate as defined in claim 3 and a sufficient amount of a monomeric vinyl cross linking agent of the group consisting of styrene, vinyl chloride, vinyl acetate, vinyl benzoate, vinyl methyl ketone, acrylonitrile, methyl methacrylate, ethyl methacrylate, butyl methacrylate, cyclohexyl methacrylate, 2-ethylhexyl methacrylate, methyl acrylate, ethyl acrylate, butyl acrylate, glycol bismethacrylate, glycidyl methacrylate, trimethylolpropane diacrylate, trimethylolpropane dimethacrylate, diallyl phthalate, triallyl cyanurate, chloromethyl-phosphoric acid-diallyl ester, glycol-bis-allyl carbonate, butanediol-bis-allyl carbonate and diethylene-glycol-bis-allyl carbonate, to cause the polycarbonate to become cross linked.

9. A process for producing an insoluble resin which comprises cross linking a polycarbonate as defined in claim 3 by heating.

10. A crosslinkable mixture of a polycarbonate as defined in claim 4 and a sufficient amount of a monomeric vinyl cross linking agent of the group consisting of styrene, vinyl chloride, vinyl acetate, vinyl benzoate, vinyl methyl ketone, acrylonitrile, methyl methacrylate, ethyl methacrylate, butyl methacrylate, cyclohexyl methacrylate, 2-ethylhexyl methacrylate, methyl acrylate, ethyl acrylate, butyl acrylate, glycol bismethacrylate, glycidyl methacrylate, trimethylolpropane diacrylate, trimethylolpropane dimethacrylate, diallyl phthalate, triallyl cyanurate, chloromethyl-phosphoric acid-diallyl ester, glycol-bis-allyl carbonate, butanediol-bis-allyl carbonate and diethylene-glycol-bis-allyl carbonate, to cause the polycarbonate to become cross linked.

11. A process for producing an insoluble resin which comprises cross linking a polycarbonate as defined in claim 8 by heating.

12. An air-polymerizable linear polycarbonate of a dibasic phenol having no more than two phenyl rings in each of which there is substituted directly on the ring a beta-alkenyl hydrocarbon radical having at least three and not more than four carbon atoms, the alpha and gamma atoms of which are unsubstituted, said polycarbonate having a K-value of at least 23 and being cross linkable through the double bonds of the alkenyl radicals.

References Cited in the file of this patent

UNITED STATES PATENTS

| | | |
|---|---|---|
| 2,459,835 | Monroe | Jan. 25, 1949 |
| 2,595,343 | Derewitt | May 6, 1952 |
| 2,621,168 | Ross | Dec. 9, 1952 |

FOREIGN PATENTS

| | | |
|---|---|---|
| 507,569 | Canada | Nov. 23, 1954 |